United States Patent
Knott et al.

(10) Patent No.: US 7,043,435 B2
(45) Date of Patent: May 9, 2006

(54) SYSTEM AND METHOD FOR OPTIMIZING PROMPTS FOR SPEECH-ENABLED APPLICATIONS

(75) Inventors: Benjamin A. Knott, Round Rock, TX (US); Robert R. Bushey, Cedar Park, TX (US); John M. Martin, Austin, TX (US)

(73) Assignee: SBC Knowledgfe Ventures, L.P., Reno, NV (US)

( * ) Notice: Subject to any disclaimer, the term of this patent is extended or adjusted under 35 U.S.C. 154(b) by 42 days.

(21) Appl. No.: 10/942,605

(22) Filed: Sep. 16, 2004

(65) Prior Publication Data

US 2006/0069569 A1    Mar. 30, 2006

(51) Int. Cl.
*G10L 21/00* (2006.01)

(52) U.S. Cl. .................................... 704/270
(58) Field of Classification Search ............... None
See application file for complete search history.

(56) References Cited

U.S. PATENT DOCUMENTS

| | | | |
|---|---|---|---|
| 5,581,600 A | 12/1996 | Watts et al. | 379/67 |
| 5,633,909 A | 5/1997 | Fitch | 379/15 |
| 5,642,518 A | 6/1997 | Kiyama et al. | 395/757 |
| 5,924,105 A | 7/1999 | Punch, III et al. | 707/513 |
| 6,202,043 B1 | 3/2001 | Devoino et al. | 703/17 |
| 6,212,517 B1 | 4/2001 | Sato et al. | 707/5 |
| 6,314,402 B1 | 11/2001 | Monaco et al. | 704/275 |
| 6,335,964 B1 | 1/2002 | Bowater et al. | 379/88.16 |
| 6,368,177 B1 * | 4/2002 | Gabai et al. | 446/404 |
| 6,405,170 B1 | 6/2002 | Phillips et al. | 704/270 |
| 6,516,051 B1 | 2/2003 | Sanders | 379/10.03 |
| 6,598,022 B1 | 7/2003 | Yuschik | 704/275 |
| 6,671,672 B1 * | 12/2003 | Heck | 704/273 |
| 6,744,885 B1 * | 6/2004 | Ketchum et al. | 379/406.03 |
| 2002/0072914 A1 | 6/2002 | Alshawi | 704/270.1 |
| 2003/0091163 A1 | 5/2003 | Attwater et al. | 379/88.01 |

(Continued)

OTHER PUBLICATIONS

Robert R. Bushey et al., U.S. Patent Application, entitled "System, Method and Software for a Speech-Enabled Call Routing Application Using an Action-Object Matrix," filed Dec. 15, 2003, U.S. Appl. No. 10/736,296, 27 pages, 5 pages of drawings.

(Continued)

*Primary Examiner*—David D. Knepper
(74) *Attorney, Agent, or Firm*—Baker Botts L.L.P.

(57) ABSTRACT

A computer-implemented method is described for optimizing prompts for a speech-enabled application. The speech-enabled application is operable to receive communications from a number of users and communicate one or more prompts to each user to illicit a response from the user that indicates the purpose of the user's communication. The method includes determining a number of prompt alternatives (each including one or more prompts) to evaluate and determining an evaluation period for each prompt alternative. The method also includes automatically presenting each prompt alternative to users during the associated evaluation period and automatically recording the results of user responses to each prompt alternative. Furthermore, the method includes automatically analyzing the recorded results for each prompt alternative based on one or more performance criteria and automatically implementing one of the prompt alternatives based on the analysis of the recorded results.

28 Claims, 4 Drawing Sheets

U.S. PATENT DOCUMENTS

| | | | |
|---|---|---|---|
| 2003/0195739 A1 | 10/2003 | Washio | 704/1 |
| 2003/0210139 A1* | 11/2003 | Brooks et al. | 340/531 |
| 2003/0212561 A1 | 11/2003 | Williams et al. | 704/270 |
| 2004/0073431 A1* | 4/2004 | Galanes et al. | 704/270.1 |
| 2004/0083092 A1 | 4/2004 | Valles | 704/9 |

OTHER PUBLICATIONS

Robert R. Bushey et al., U.S. Patent Application, entitled "Method for Designing an Automated Speech Recognition (ASR) Interface for a Customer Call Center," filed May 24, 2004, U.S. Appl. No. 10/852,342, 25 pages, 4 pages of drawings.

Theodore B. Pasquale et al., U.S. Patent Application, entitled "System, Method and Software for Transitioning Between Speech-Enabled Applications using Action-Object Matrices," filed May 12, 2004, U.S. Appl. No. 10/843,924, 40 pages, 7 pages of drawings.

* cited by examiner

FIG. 3

| OBJECTS | ACTIONS | | | | | | | | | | | |
|---|---|---|---|---|---|---|---|---|---|---|---|---|
| | ACQUIRE | CANCEL | CHANGE | INQUIRE | INFORM | HOW TO USE | SCHEDULE | FIX REPAIR | WHERE | RECONNECT | MOVE | PAY |
| OPTIONAL SERVICES: CALLNOTES CALLFORWARDING CALLERID PACKAGES DSL LONGDISTANCE ETC. | • *214* | • | • | • | | | | | | | | |
| BASIC SERVICE | • | • | • | • | | • | | • | | | | |
| CPE | • | • | | | | • *212* | | • | | | | |
| ACCOUNT | | | • *206* | • | | | | | | | | |
| BILL | | | • | • | • | | | • | • *208* | | | • |
| ACQUISITION | | | • | • | • | | • | | | | | |
| CANCELATION | | • | • | • | • | | • | | | | | |
| FIX-REPAIR | | | • | • | • | | • | | | | | |
| MOVE | | • | • | • | • | • | • | | | • | • | |
| PAYMENT | | | | • | | | | | • | • *210* | | |
| OTHER PROVIDERS | | | | • | | | | | | | | |
| COUPONS SPECIALS | | | | • | | | | | | | | |
| NAME/NUMBER | | | | • | | | | | | | | |
| STORE LOCATIONS | | | | | | | | | | | | |

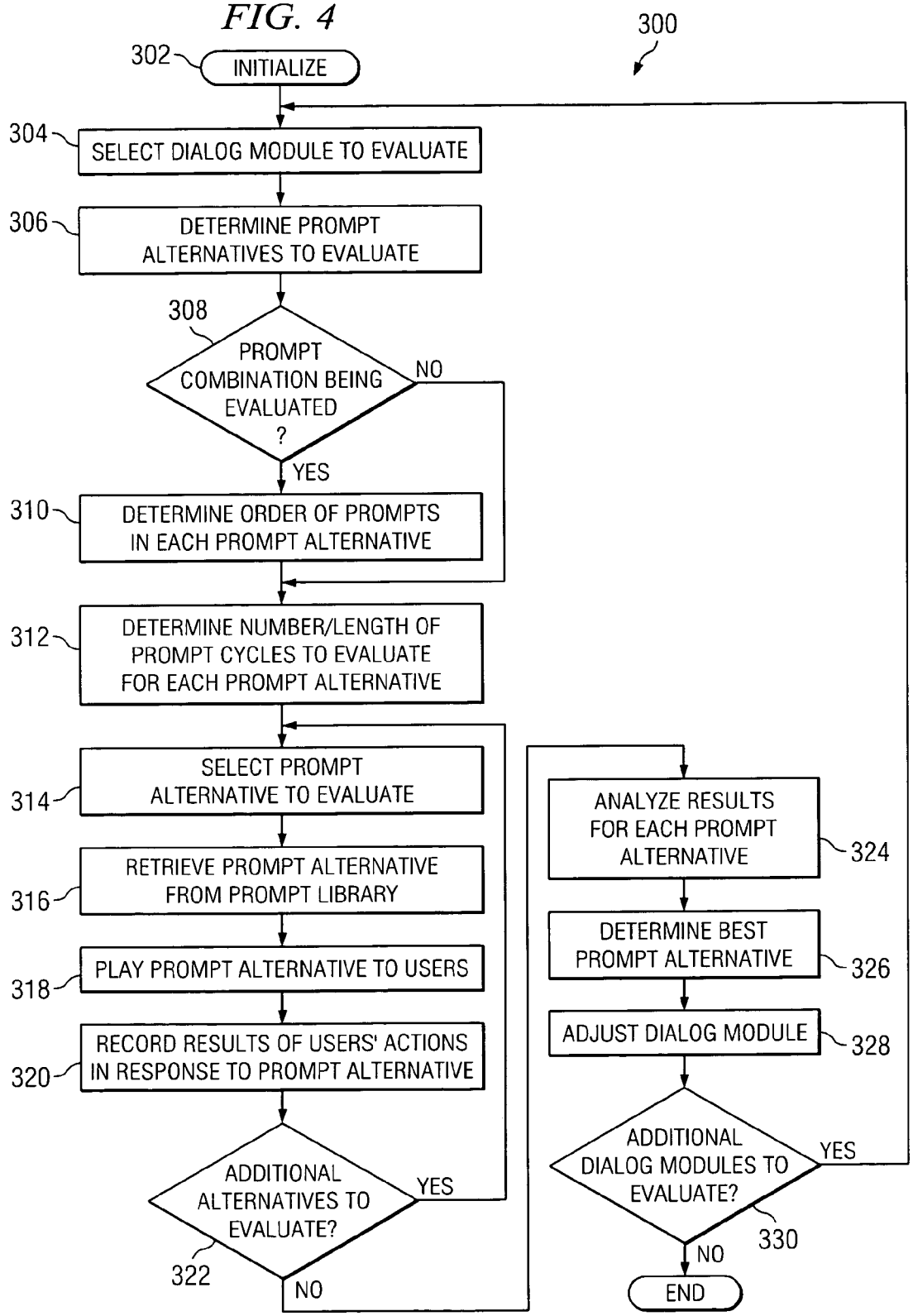

SYSTEM AND METHOD FOR OPTIMIZING PROMPTS FOR SPEECH-ENABLED APPLICATIONS

TECHNICAL FIELD OF THE INVENTION

The present invention relates generally to speech-enabled applications and, more particularly, to a system and method for optimizing prompts for speech-enabled applications.

BACKGROUND OF THE INVENTION

Developments in speech recognition technologies support more natural language interaction between services, systems and customers than previously supported. One of the most promising applications of speech recognition technology, Automatic Call Routing (ACR), seeks to determine why a customer has called a service center and to route the customer to an appropriate service agent for customer request servicing. Speech recognition technology generally allows an ACR application to recognize natural language statements from the customer, thus minimizing reliance on conventional menu systems. This permits a customer to state the purpose of their call "in their own words".

In order for an ACR application to properly route calls, the ACR generally must interpret the intent of the customer, identify the type or category of customer call, and identify the correct routing destination for the call type. An ACR application may attempt to match one or words in a statement by a customer to a particular pre-defined action to be taken by the ACR application.

Although speech recognition technology has been improving over the years, speech recognition systems are limited by the quality and robustness of the statistical language models or other techniques used to recognize speech. Given these limits, developers of these systems strive to develop prompts, announcements, and other instructions to the users of such systems that guide these users to provide speech input that conforms with the capabilities of the particular speech recognition technology used by the system. Subtle differences in the way prompts or other instructions are worded may result in substantial differences in system performance.

SUMMARY OF THE INVENTION

In accordance with a particular embodiment of the present invention, a computer-implemented method is provided for optimizing prompts for a speech-enabled application. The speech-enabled application is operable to receive communications from a number of users and communicate one or more prompts to each user to illicit a response from the user that indicates the purpose of the user's communication. The method includes determining a number of prompt alternatives (each including one or more prompts) to evaluate and determining an evaluation period for each prompt alternative. The method also includes automatically presenting each prompt alternative to users during the associated evaluation period and automatically recording the results of user responses to each prompt alternative. Furthermore, the method includes automatically analyzing the recorded results for each prompt alternative based on one or more performance criteria and automatically implementing one of the prompt alternatives based on the analysis of the recorded results.

Technical advantages of particular embodiments of the present invention include a method and system for optimizing prompts for speech-enabled applications that improve the operation of such applications. For example, particular embodiments automate the evaluation of various prompts or other user instructions for speech-enabled applications and then automatically implement the most effective prompt(s). Such embodiments can automatically present numerous prompt variations to users, evaluate the impact of each prompt on some measure of system performance, and adopt the prompt(s) that lead to the best system performance. This automation of prompt evaluation and implementation can reduce development time and ensure high system performance.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 is a diagram depicting an example embodiment of an automatic call router action-object matrix according to one embodiment of the present invention; and FIG. 4 is a flow diagram depicting an example method for optimizing prompts for speech-enabled applications according to one embodiment of the present invention.

DETAILED DESCRIPTION OF THE DRAWINGS

Figure 1:
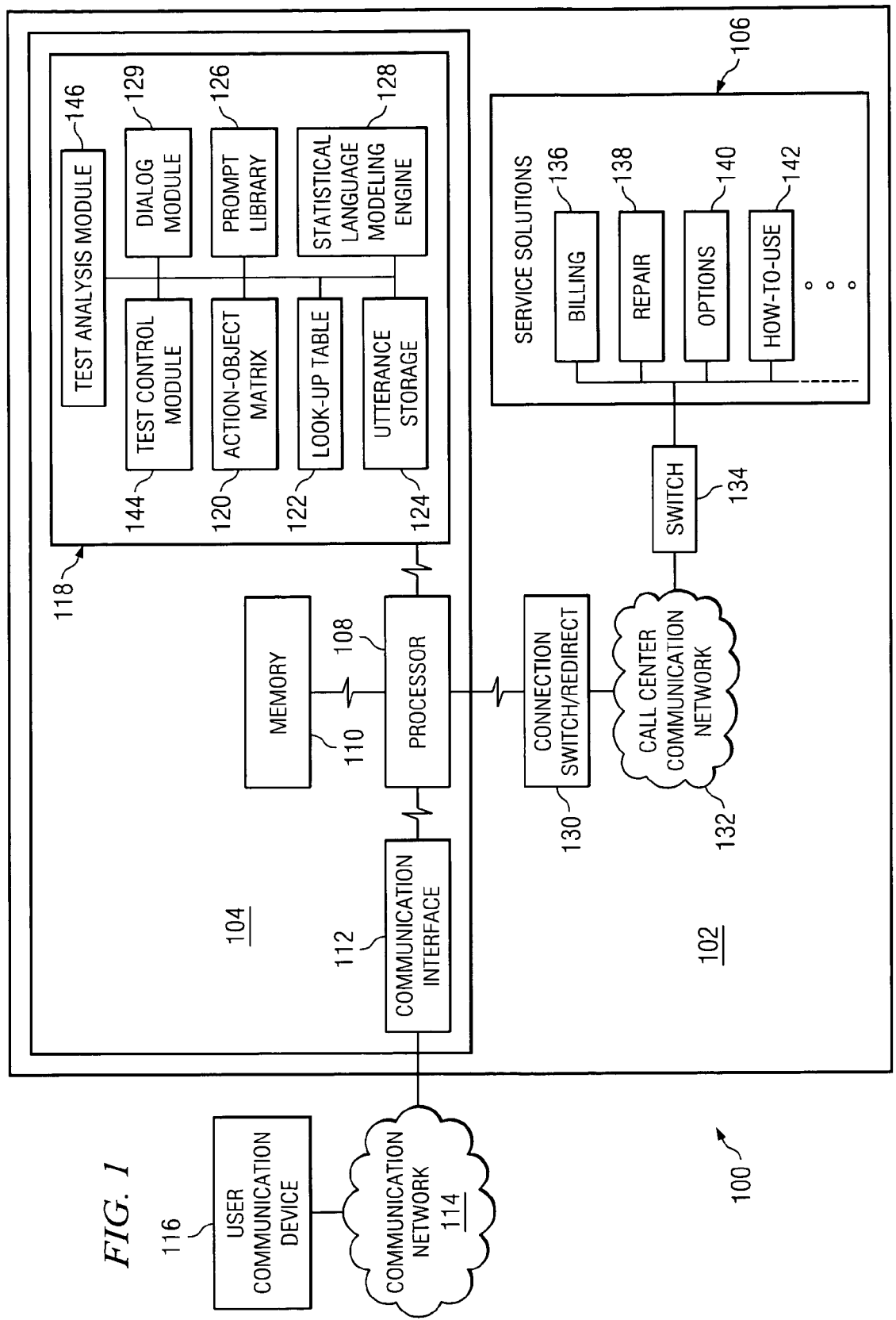
FIG. 1 is a block diagram depicting an example embodiment of a service center system according to one embodiment of the present invention.

FIG. 1 is a block diagram depicting an example embodiment of a service center system 100 according to one embodiment of the present invention. System 100 enables users to conduct transactions via a service center 102. For example, as referred to herein, service center 102 may be a customer service call center for a telephone services company. However, as described below, the present invention may be used in conjunction with any other types of call centers, as well as with any systems that use speech recognition to perform an action or otherwise facilitate an action in response to speech input of a user. As used herein, the term "transaction" or it variants refers to any action that a user desires to perform in conjunction with or have performed by service center 102.

The example service center 102 includes one or more computing apparatuses 104 that are operably coupled to one or more transaction processing service solutions 106. Included in computing apparatus 104 is a processor 108. Operably coupled to processor 108 of computing apparatus 104 is a memory 110. Computing apparatus 104 employs processor 108 and memory 110 to execute and store, respectively, one or more instructions of a program of instructions (i.e., software).

Also included in computing apparatus 104 is communication interface 112. Communication interface 112 is preferably operable to couple computing apparatus 104 and/or service center 102 to an internal and/or external communication network 114. Communication network 114 may be the public-switched telephone network (PSTN), a cable network, an internet protocol (IP) network, a wireless network, a hybrid cable/PSTN network, a hybrid IP/PSTN network, a hybrid wireless/PSTN network, the Internet, and/or any other suitable communication network or combination of communication networks.

Communication interface 112 preferably cooperates with communication network 114 and one or more user communication devices 116 to permit a user associated with each user communication device 116 to conduct transactions via service center 102. User communication device 116 may be a wireless or wireline telephone, dial-up modem, cable modem, DSL modem, phone sets, fax equipment, answering machines, set-top boxes, televisions, POS (point-of-sale) equipment, PBX (private branch exchange) systems, personal computers, laptop computers, personal digital assistants (PDAs), other nascent technologies, or any other appropriate type or combination of communication equipment available to a user. Communication device 116 may be equipped for connectivity to communication network 114 via a PSTN, DSL, cable network, wireless network, or any other appropriate communications channel.

In operation, service center 102 permits a user to request, using speech, processing or performance of one or more transactions by service solutions 106. To enable such processing, computing apparatus 104 may include or have access to one or more storage devices 118 including one or more programs of instructions operable to interpret user intent from the user's speech, identify a solution sought by the user, and route the user to an appropriate service solution 106.

To aid in the interpretation, identification and routing operations of service center 102, storage 118 includes an action-object matrix 120, a look-up table 122, utterance storage 124, a prompt library 126, one or more speech recognition modules (such as a statistical language modeling engine 128), and one or more dialog modules 129. Furthermore, to analyze and optimize the performance of the prompts used by service center 102, storage 118 also includes a prompt test control module 144 and a prompt test analysis module 146. Additional details regarding the operation and cooperation of the various components included in storage 118 will be discussed in greater detail below.

In the illustrated embodiment, computing apparatus 104 is communicatively coupled to one or more connection switches or redirect devices 130. Connection switch or redirect device 130 enables computing apparatus 104, upon determining an appropriate destination for the processing of a user-selected transaction, to route the user via communication network 132 and, optionally, one or more switches 134, to an appropriate service agent or module of service solutions 106.

Service solutions 106 preferably include a plurality of service agents or modules operable to perform one or more operations in association with the processing of a selected user transaction. For example, if service center 102 is a telephone services call center, service solutions 106 may include one or more service agents or modules operable to perform billing service solutions 136, repair service solutions 138, options service solutions 140, how-to-use service solutions 142, as well as any other appropriate service solutions. The service agents or modules implemented in or associated with service solutions 106 may include, but are not limited to, automated or self-service data processing apparatuses, live technician support (human support), or combinations thereof.

Figure 2:
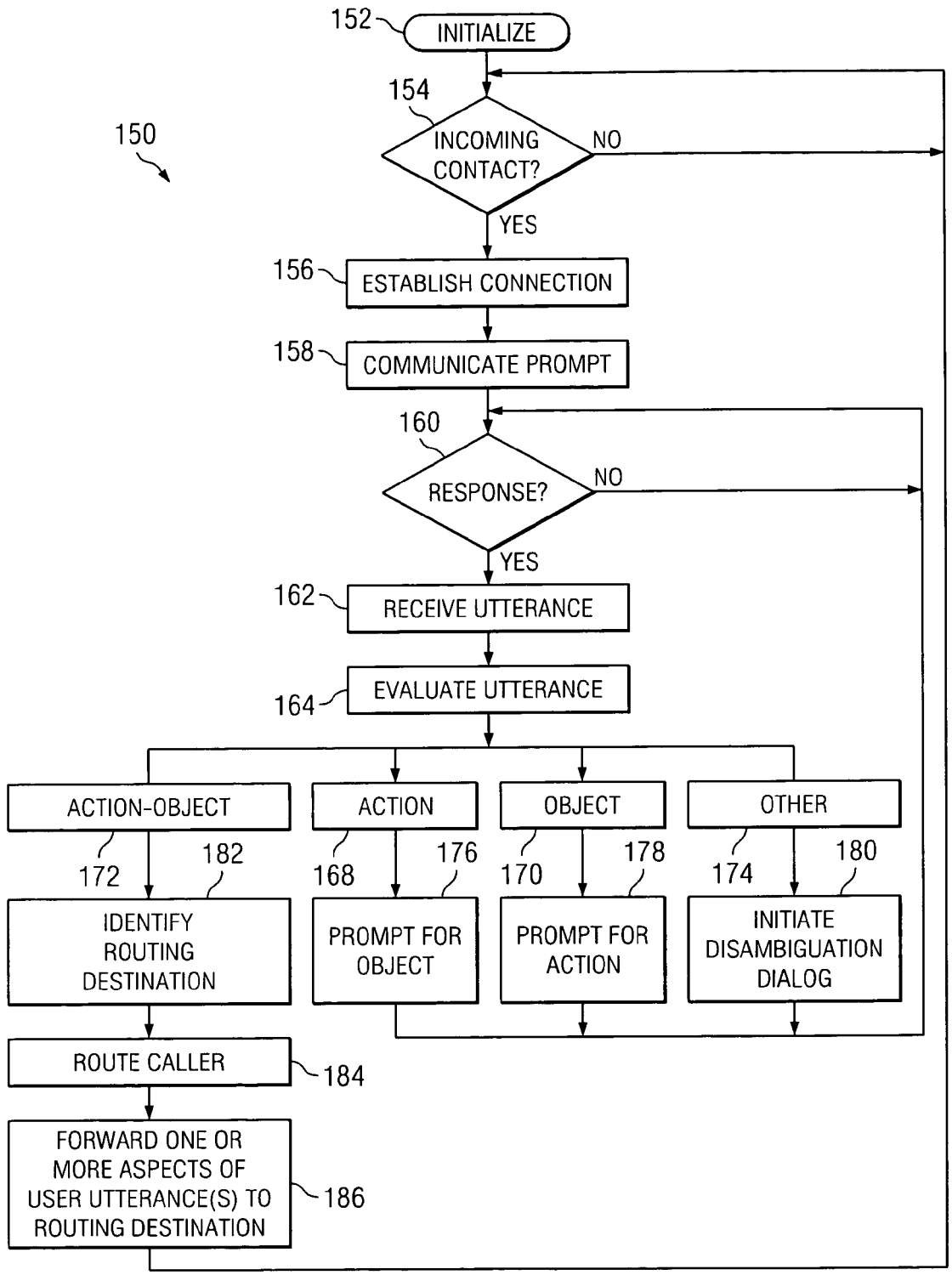
FIG. 2 is a flow diagram depicting an example automatic call routing method according to one embodiment of the present invention.

FIG. 2 illustrates an example method 150 for a speech-enabled call routing using an action-object matrix according to one embodiment of the present invention. However, it should be emphasized that embodiments of the present invention may be used in association with any speech-enabled applications using prompts and is certainly not limited to service centers routing users using action-objects. Method 150 of FIG. 2 may be implemented in one or more computing apparatuses 104 of one or more service centers 102. As such the method will be described with reference to the operation of service center 102 of FIG. 1.

Upon initialization of service center 102 at step 152, method 150 proceeds to step 154 where service center 102 provides for and awaits an incoming communication from a user communication device 116 via communication network 114. However, a user may connect with service center 102 in any other suitable manner.

Upon detection of an incoming contact at step 154, method 150 preferably proceeds to step 156 where a communication connection with the user communication device 116 is established. As suggested above, establishing a communication connection with an incoming contact from a user at step 156 may include, but is not limited to, receiving a user phone call via a PSTN or other wireline network, a wireless network, or any of numerous other communication networks.

Once a communication connection has been established at step 156, method 150 proceeds to step 158 where one or more prompts, announcements, or other instructions to the user (collectively referred to herein as "prompts") are communicated to the user of user communication device 116. In particular embodiments, the communication of one or more prompts is aimed at eliciting a request from the user for the processing of one or more transactions or operations. For example, at step 158, dialog module 129 may access prompt library 126 of storage 118 to generate a user transaction selection prompt such as, "Thank you for calling our service center. Please tell me how we may help you today." Furthermore, any other suitable prompts designed to elicit a response from the user regarding a transaction that the user desires to be performed may be used.

Preferably, a prompt will serve to illicit an unambiguous statement of the user's intent. If the user utterance is ambiguous or incomplete service center 102 will need to engage in additional dialog to clarify the user's intentions. For example, in response to initial prompt from service center 102, the most desirable outcome is for the user's response to the prompt to result in a "direct route" to the appropriate destination. However, if the user's response requires additional clarification (further user responses) before service center 102 can determine the appropriate destination, service center 102 will need to employ dialog module 129 to provide additional prompts to the user in an attempt to illicit an unambiguous statement from the user. This additional prompting increases costs (for example, by occupying incoming communication channels) and reduces customer satisfaction.

At step 160 of method 150, service center 102 awaits a user response to the communicated prompt. Upon detection of a user response at step 160, method 150 preferably proceeds to 162 where a natural language response (a user "utterance") from the user responsive to the communicated prompt is preferably received. Receipt of an utterance from a user may include storage of the user's utterance in utterance storage 124 of computing apparatus storage 118. Permanent or temporary storage of a user utterance may enable and/or simplify the performance of speech recognition analysis thereon.

Following receipt of a user utterance at step 162, method 150 proceeds to step 164 where the user utterance is evaluated to interpret or identify an intent of the user and a requested transaction to be performed. In particular embodiments, evaluation of a user utterance at step 164 may include the use of one or more speech recognition technologies, such as that available from statistical language modeling engine 128 of computing apparatus 104. As suggested above, statistical language modeling engine 128 may cooperate with utterance storage 124 in the evaluation of the user utterance.

In certain embodiments, statistical language modeling engine 128 may evaluate the user utterance received at step 162 in cooperation with action-object matrix 120, which defines a number of different action-objects (and which is described in greater detail below in conjunction with FIG. 3). In the evaluation of a user utterance at step 164, the speech recognition technology preferably employed by computing apparatus 104 seeks to identify an action, an object or an action-object combination from the user utterance. By creating a finite number of transaction options (i.e., action-objects) via action-object matrix 120, proper routing of a user to a service agent or module 136, 138, 140 or 142, may be accomplished with improved efficiency (for example, substantially eliminating user routing errors and, therefore, user re-routing).

Each action-object in action-object matrix 120 defines a particular action to be taken and an object that is the subject of the action (in other words, a transaction to be performed). For example, the action-object "pay/bill" defines an action "pay" to be carried out on an object "bill." As described below, the assignment of an action-object to a user utterance enables efficient routing of the user to enable performance of a desired transaction.

To assist in assigning a particular action-object to a user utterance in particular embodiments, statistical language modeling engine 128 may store and associate one or more salient action terms and one or more salient object terms with each action-object. The statistical language modeling engine 128 can then search for these salient terms in a user utterance to assign the user utterance to a particular action-object. The salient terms may be the actual action and object of the action-object and/or the salient terms may be different from the action and object. For example, the action-object "pay/bill" may be associated with the salient action term "pay" and the salient object term "bill." In addition, the "pay/bill" action-object may be associated with the salient object terms "account" and "invoice." Therefore, any user utterance including the term "pay" and at least one of the terms "bill," "account" or "invoice" would preferably be associated with the "pay/bill" action-object. Multiple salient action terms could also or alternatively be associated with this action-object. At least a portion of the user utterance evaluation performed at step 164 may include determining whether the user utterance includes a salient action term, a salient object term, or both a salient action term and a salient object term.

If it is determined that the user utterance contains only a salient action term(s) 168, method 150 proceeds to step 176 where one or more additional prompts may be communicated to the user using dialog module 129, using a different dialog module 129 than the module that communicated the initial prompt, or using any other suitable component. The prompts presented at step 176 are preferably designed to elicit the selection of an object (via a salient object term) in a subsequent user utterance. For example, referring to the action-object matrix depicted in FIG. 3, it may have been determined from the initial user utterance that the user desires to "inquire" about something. Having identified that the user wishes to make an "inquiry" (the action), computing apparatus 104 may cooperate with dialog module 129, prompt library 126 and action-object matrix 120 to prompt the user for selection of an object associated with the "inquire" action. As illustrated in FIG. 3, examples of objects associated with the "inquire" action include, in one embodiment, optional services, basic service, billing, cancellation, repair, payment, specials, and name and number. It should be understood that the action-object matrix depicted generally in FIG. 3 is included primarily for purposes of illustration. As such, alternate embodiments of an action-object matrix (or embodiments not using an action-object matrix) may be implemented without departing from the spirit and scope of teachings of the present invention.

Similarly, if it is determined that the user utterance contains only a salient object term 170, method 150 preferably proceeds to step 178 where one or more prompts designed to elicit the selection of an action (via a salient action term) in a subsequent user utterance. For example, referring again to the action-object matrix generally depicted in FIG. 3, if it is determined from the initial user utterance that the user desires some sort of action associated with a "bill", computing apparatus 104 may cooperate with dialog module 129, action-object matrix 120 and prompt library 126 to generate one or more prompts directed to eliciting user selection of an "action" associated with the bill "object". As shown in FIG. 3, examples of actions associated with a "bill" object may include, in one embodiment, inquiry, information, fixing or repairing, and paying.

Method 150 may loop through steps 176 or 178 one or more times in an attempt to illicit an appropriate salient action term or an appropriate salient object term, respectively, for any desired number of loops. If evaluation of the user utterances does not lead to the utterance of a salient action term 168 nor a salient object term 170 after a predetermined number of loops, if neither a salient action term 168 or a salient object term 170 are identified (an "other" utterance 174), or if salient action terms 168 and/or salient object terms 170 associated with multiple action-objects are identified, then method 150 proceeds to step 180 where a disambiguation dialogue may be initiated and performed by dialog module 129. In such an event, method 150 preferably provides for additional appropriate dialogue to be performed with the user in an effort to elicit a usable "action-object" combination from the user (for example, asking the user to be more specific in his or her request).

Following prompting for an "object" at step 176, prompting for an "action" at step 178, or initiation and performance of disambiguation dialogue at 180, method 150 preferably returns to step 160 where a response may be awaited as described above. Method 150 then preferably proceeds through the operations at steps 162 and 164 until an "action-object" combination 172 has been elicited from the user in a user utterance. An escape sequence may also be included in method 150 where it has been determined that a user requires human assistance, for example.

After identification of an "action-object" combination 172 (either from the initial utterance or from the repeated prompting described above), method 150 preferably proceeds to step 182. At step 182, computing apparatus 104 preferably cooperates with action-object matrix 120 and look-up table 122 to identify a preferred or proper routing destination for processing the user-selected transaction. As suggested above, the routing destinations identified at step 182 may include routing destinations associated with the service agents or modules available in service solutions 106. As mentioned above, service agents or modules 136, 138, 140 and 142 may include automated transaction processing available via computing apparatus 104 or a similar device, live support, or combinations thereof, as well as other suitable transaction processing options.

Following identification of a preferred or proper routing destination at step 182, method 150 preferably proceeds to step 184 where the user connection is preferably routed to the appropriate destination indicated in look-up table 122. Following the routing of the user connection, method 150 preferably proceeds to step 186 where one or more aspects of the user utterance or utterances are optionally forwarded to the service agent or module destination to which the caller and/or user connection is routed. For example, in particular embodiments, method 150 provides for the identified action-object to be forwarded to the service agent associated with the selected routing destination. In yet other embodiments, no information is forwarded and the user is simply routed to the appropriate destination. Following the routing of the user connection (and any forwarding of information), method 150 preferably returns to step 154 where another user connection is awaited.

It should be understood that some of the steps illustrated in FIG. 2 may be combined, modified or deleted where appropriate, and additional steps may also be added to the method. Additionally, as indicated above, the steps may be performed in any suitable order without departing from the scope of the present invention. Furthermore, it should be understood that although embodiments of the present invention are described in conjunction with a service center using action-objects and salient terms, the present invention may be used in conjunction with any speech-enabled applications that use prompts to illicit a response to determine the user's intent.

Referring again to FIG. 3, an action-object matrix 120 according to one embodiment of the present invention is shown. The example action-object matrix 120 shown in FIG. 3 includes a number of columns of actions 202 and a number of rows of objects 204. The intersection of an action column with an object row generally defines an action-object pair identifying a transaction available via service center 102 (for example, using one or more service modules or agents 136, 138, 140 and 142).

As described above, action-object matrix 120 is used in association with other components of service center 102 to interpret user intent and identify a desired transaction from a user utterance. For example, using actions 202 and objects 204 of action-object matrix 120, in conjunction with the method 150 described above, a user utterance such as "How much do I owe on my bill?" may be evaluated to relate to the action-object "inquire/bill" 206. In a further example, the user utterance, "I have a problem with a charge on my bill" may be associated with the action-object "fix-repair/bill" 208. In still another example, the user utterance, "Where can I go to pay my phone bill?" may be associated with the action-object "where/payment" 210. In yet another example, the user utterance, "How do I set up Call Forwarding?" may be associated with the action-object "how-to-use/option" services 212. In a further example, the user utterance, "I'd like to get CallNotes" may be associated with the action-object "acquire/optional services" 214.

As mentioned above, service center 102 uses one or more salient action terms and one or more salient object terms associated with each action-object to associate a user utterance with the action-object. The salient terms may be stored in association with action-object matrix 120 or elsewhere in service center 102 (or at a location remote to service center 102). If stored in association with action-object matrix 120, the salient terms may be linked to particular action-objects, to particular actions (for salient action terms), or to particular objects (for salient object terms).

After an action-object has been identified through the user of action-object matrix 120 and other components of service center 102, look-up table 122 is used to identify the routing destination associated with an identified action-object. For example, upon identifying action-object "inquire/bill" 206 from a user utterance, computing apparatus 104 may utilize action-object matrix 120 and look-up table 122 to determine that the appropriate routing destination for the "inquire/bill" action-object 206 is "Bill" service agent or module 136. In another example, upon identifying action-object "fix-repair/bill" 208 from a user utterance, computing apparatus 104 cooperating with action-object matrix storage 120 and look-up table 122 may determine that an appropriate routing destination for the user connection includes "Repair" service agent or module 138. Additional implementations of associating a look-up table with an action-object matrix may be utilized without departing from the spirit and scope of teachings of the present invention.

FIG. 4 is a flow diagram depicting an example method 300 for optimizing prompts for speech-enabled applications according to one embodiment of the present invention. As described above, although the example method 300 is described with respect to service center 102, the method may be applied to any speech-enabled application that use prompts (again, this term refers to prompts, announcements, or any other instructions provided to a user) to illicit a response to determine a user's intent (regardless of how the user's intent is determined).

Upon initialization at step 302, method 300 proceeds to step 304 where a particular dialog module 129 to evaluate is selected. A speech-enabled application, such as service center 102, may include multiple dialog modules 129 and each dialog module may be tested separately. For example, an application may have one dialog module 129 that provides the initial prompt (and any associated announcements) and may include other dialog modules that provide additional prompts to obtain more detailed or unambiguous responses from a user. Using service center 102 as an example, control of the prompt testing process may be performed by test control module 144 and thus module 144 may select a dialog module to evaluate. If service center 102 includes multiple dialog modules 129, test control module 144 may serially select each dialog module 129 for testing at particular intervals. This selection may be performed automatically based on a pre-determined configuration or may be based on input from a person configuring the test procedure.

Method 300 continues at step 306 where the prompt alternatives to evaluate for the selected dialog module are determined. For example, prompt library 126 may include multiple alternative prompts for the initial prompt provided by service center 102. Test control module 144 may access prompt library 126 to retrieve these alternative prompts and may determine which prompts are to be evaluated. For example, prompt library 126 may initially include several alternative initial prompts and test control module 144 may initially select all the alternative prompts for testing. As an example, after testing all of the alternative initial prompts, test control module 144 may eliminate certain prompts that performed poorly relative to the other prompts and may repeat the testing process on the remaining prompts if necessary. Alternatively, the particular prompts to be evaluated may be determined based on input from a person configuring the test procedure.

In some cases, one or more of the prompt alternatives may include a combination of prompts (including announcements, etc.) to be evaluated. For example, method 300 could be used to test an announcement followed by a prompt or a series of prompts. Therefore, at step 308 it is determined whether prompt combinations are being evaluated. If so, method 300 continues to step 310 where the order and particular combinations of the prompts to be tested are determined. For example, the same initial prompt could be tested with three different preceding announcements, or an announcement could be tested with three different prompts following the announcement. As another example, an initial prompt could be followed by pauses of different lengths (or no pause) before a series of example responses are provided to the user. As yet another example, the order of two or more prompts may be tested, with each different order being a different alternative. Any particular combination and/or order of prompts may be tested. Furthermore, other variations of the way in which multiple prompts are played may be evaluated. The information regarding the different combinations to be tested may be provided to and stored by test control module 144 for use in executing the testing.

Once the order the prompts in each of the prompt alternatives has been determined (or if it is determined at step 308 that the prompt alternatives do not include any prompt combinations), method 300 proceeds to step 312 where the number of prompt cycles, length of time, and/or other characteristics of the evaluation period during which each prompt alternative is to be evaluated is determined. For example, a first prompt alternative "How may I help you?" may be used as the initial prompt for a one week period and then a second prompt alternative "What is the purpose of your call?" may be used for the following one week period. Alternatively, as an example, the first prompt alternative may be tested for the first one thousand prompt cycles (for example, calls from users) and the second prompt alternative may be tested for the next thousand prompt cycles. Furthermore, prompt alternatives may be testing in an alternating fashion (for example, a first prompt may tested for a single user, a second prompt may be tested on the next user, and the process may be repeated any desired number of times). Moreover, one or more of the alternative prompts may be tested for differing lengths of times, number of prompt cycles, or other evaluation periods as desired. Information about the testing period(s) to be used for each prompt alternative may be provided to and stored by test control module 144 for use in executing the testing.

Method 300 continues at step 314, where a first prompt alternative is selected from the multiple prompt alternatives determined to be part of the evaluation at step 306. This step may be performed automatically by test control module 144. For example, if the two prompt alternatives to be evaluated are "How may I help you?" and "What is the purpose of your call?", then test control module 144 may select one of these alternatives to begin testing.

At step 316, the selected prompt alternative is retrieved from prompt library 126 (or any other suitable location). For example, the prompt alternative may be an audio file (such as a .wav file) that is retrieved from prompt library 126). At step 318, the retrieved prompt alternative is presented to a user. For example, a .wav file may be played for the user. The playing or other presentation of the prompt alternative (which, again, may include a combination of prompts, announcements, pauses, etc.) is repeated for each user (such as callers calling into service center 102) during the evaluation period determined at step 312. The selected prompt may be retrieved and presented by the associated dialog module 129, test control module 144, or any combination thereof (and reference to dialog module 129 performing this task is meant to include any of these options).

At step 320, test analysis module 146 or any other suitable component (such as test control module 144) records the results of each user's actions taken in response to the prompt alternative. Any suitable results of the user's interaction with service center 102 or other application presenting a prompt can be recorded for later evaluation. For example, the user's actual response(s) to the prompt alternatives may be recorded. In addition or alternatively, whether the user's response included a salient action term and/or a salient object term (for example, based on an evaluation of the response by statistical language modeling engine 128) may be recorded. As another example, test analysis module 146 or another suitable component may record whether the user's response resulted in a direct route or whether it required additional dialog from a dialog module 129 to clarify the user's intent. The component, such as test analysis module 146, recording this information for evaluation can cooperate with any other suitable components of the system being analyzed to obtain this information. For example, test analysis module 146 may communicate with statistical language modeling engine 128, action-object matrix 120, dialog module(s) 129, or any other appropriate components of service center 102 to record suitable information for evaluating the performance of a particular prompt alternative.

Furthermore, it is again emphasized that the present invention may apply to any type of speech-enabled applications, and is not limited to the service center example provided herein. Therefore, suitable performance criteria may be unrelated to the routing of users/callers to a destination. For a given prompt, or set of prompts, a variety of performance measures may be evaluated, such as the percentage of timeouts (for example, when no response is received from a user), the percentage of "too much speech" (for example, the user says more than the speech engine can process), the percentage of utterances that are "in grammar" (for example, the utterance matches a defined grammar item in an engine that recognizes types of grammar), or the number of times a caller asks for "help." These are but a few examples and there are a wide range of different measures for prompt performance other than action-objects and direct routes.

At the end of the evaluation period for the first prompt alternative, method 300 proceeds to step 322 where it is determined whether there are additional prompt alternatives to evaluate. For example, test control module 144 can determine whether all the prompt alternatives selected at step 306 have been evaluated. If there are additional prompt alternatives to evaluate, method 300 returns to step 314, where the next prompt alternatives to evaluate is selected. Steps 316 through 320 are then performed for that prompt alternatives, as described above.

Once it is determined at step 322 that no further prompt alternatives remain to be evaluated (for the selected dialog module), method 300 proceeds to step 324 where test analysis module 146 or any other suitable component analyzes the information recorded at step 320 for each of the prompt alternatives. For example, test analysis module 146 may determine which prompt alternative resulted in the most direct routes (for example, the highest percentage of direct routes) or which alternative had the most initial responses that resulted in a match with an action-object (for example, responses that included both a salient action term and a salient object term). Any number of additional or alternative performance criteria that assist in identifying the most effective prompt alternative may be analyzed by analysis module 146, as desired. This analysis may be performed in "real-time" while service center 102 or other system being evaluated is continuing to interact with users. Furthermore, some or all of analysis step 324 may occur for each prompt alternative while that prompt alternative or other prompt alternatives are being tested.

Based on the analysis performed at step 324, test analysis module 146 compares the results of the analysis and determines the "best" prompt alternative at step 326. Which prompt alternative is the best depends on the criteria being evaluated. As examples only, the prompt alternative resulting in the most direct routes or resulting in the most action-object matches (either initially or after further prompting) may be selected as the best prompt alternative at step 326. Once the best prompt alternative is selected, test analysis module 146 or any other suitable component automatically adjusts the dialog module at step 328 to implement the chosen prompt alternative. This automatic evaluation and adjustment of prompts is advantageous since manually testing and adjusting various prompts is time consuming and may interrupt or impede the performance of the system being tested.

After the dialog module 129 being tested is appropriately adjusted, method 300 continues to step 330 where it is determine whether there are additional dialog modules 129 to evaluate. If so, method 300 returns to step 304 where a new dialog module 129 is selected for evaluation. If not, method 300 ends. Method 300 may be repeated as often as desired during the operation of a service center or other speech-enabled application to which the method might apply. For example, method 300 may be performed when a service center or other speech-enabled application is initially put into operation. Thereafter, the method could be performed periodically as desired (for example, every six months). Such periodic testing may be helpful as users become experienced with the prompts used in a system. The users' behavior can change with such experience and periodic updating of the prompts can be beneficial to "tune" the prompts to take into account the users' changed behavior.

It should be understood that some of the steps illustrated in FIG. 4 may be combined, modified or deleted where appropriate, and additional steps may also be added to the method. Additionally, as indicated above, the steps may be performed in any suitable order without departing from the scope of the present invention.

Although the present invention has been described in detail with reference to particular embodiments, it should be understood that various other changes, substitutions, and alterations may be made hereto without departing from the spirit and scope of the present invention. For example, although the present invention has been described with reference to a number of components included within service center 102, other and different components may be utilized to accommodate particular needs. The present invention contemplates great flexibility in the arrangement of these elements as well as their internal components. Moreover, speech-enabled applications or systems other than service centers may also be used in conjunction with embodiments of the present invention.

Furthermore, numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A computer-implemented method for optimizing prompts for a speech-enabled application, the speech-enabled application operable to receive a communication from each of a plurality of users and to communicate one or more prompts to each user to illicit one or more responses from the user indicating the purpose of the user's communication, the method comprising:
   determining a plurality of prompt alternatives to evaluate, each prompt alternative comprising one or more prompts;
   determining an evaluation period for each prompt alternative;
   automatically presenting each prompt alternative to one or more users during the associated evaluation period;
   automatically recording one or more results of one or more responses to each prompt alternative received from the users;
   automatically analyzing the recorded results for each prompt alternative based on one or more performance criteria; and
   automatically implementing one of the prompt alternatives based on the analysis of the recorded results.

2. The method of claim 1, wherein:
   one or more of the prompt alternatives comprise a combination of prompts; and
   the method further comprises determining the order in which to present the prompts in the combination.

3. The method of claim 1, wherein the evaluation period comprises the period during which a selected number of user communications are received at the speech-enabled application.

4. The method of claim 1, wherein the evaluation period comprises a selected length of time.

5. The method of claim 1, wherein recording one or more results of one or more responses comprises recording the number of direct routes that result from the user responses to each prompt alternative.

6. The method of claim 5, wherein analyzing the recorded results for each prompt alternative comprises determining which prompt alternative has the highest percentage of direct routes.

7. The method of claim 1, wherein:
   the speech-enabled application is operable to match one or more user responses with an action-object based on one or more salient terms in the user responses that are associated with the action-object; and
   recording one or more results of one or more responses comprises recording the number of user responses that the speech-enabled application is able to match with an action-object.

8. The method of claim 7, wherein analyzing the recorded results for each prompt alternative comprises determining which prompt alternative has the highest percentage of responses that the speech-enabled application is able to match with an action-object.

9. The method of claim 1, wherein the speech-enabled application comprises a call center.

10. The method of claim 1, wherein the steps of the method are repeating periodically after implementation of the speech-enabled application.

11. A computer-implemented system for optimizing prompts for a speech-enabled application, the speech-enabled application operable to receive a communication from each of a plurality of users and to communicate one or more prompts to each user to illicit one or more responses from the user indicating the purpose of the user's communication, the system comprising:
 a test control module operable to:
  determine a plurality of prompt alternatives to evaluate, each prompt alternative comprising one or more prompts; and
  determine an evaluation period for each prompt alternative;
 a dialog module operable to present each prompt alternative to one or more users during the associated evaluation period; and
 a test analysis module operable to:
  record one or more results of one or more responses to each prompt alternative received from the users;
  analyze the recorded results for each prompt alternative based on one or more performance criteria; and
  implement one of the prompt alternatives based on the analysis of the recorded results.

12. The system of claim 11, wherein:
 one or more of the prompt alternatives comprise a combination of prompts; and
 the test control module is further operable to determine the order in which to present the prompts in the combination.

13. The system of claim 11, wherein the evaluation period comprises the period during which a selected number of user communications are received at the speech-enabled application.

14. The system of claim 11, wherein the evaluation period comprises a selected length of time.

15. The system of claim 11, wherein recording one or more results of one or more responses comprises recording the number of direct routes that result from the user responses to each prompt alternative.

16. The system of claim 15, wherein analyzing the recorded results for each prompt alternative comprises determining which prompt alternative has the highest percentage of direct routes.

17. The system of claim 11, wherein:
 the speech-enabled application is operable to match one or more user responses with an action-object based on one or more salient terms in the user responses that are associated with the action-object; and
 recording one or more results of one or more responses comprises recording the number of user responses that the speech-enabled application is able to match with an action-object.

18. The system of claim 17, wherein analyzing the recorded results for each prompt alternative comprises determining which prompt alternative has the highest percentage of responses that the speech-enabled application is able to match with an action-object.

19. The system of claim 11, wherein the speech-enabled application comprises a call center.

20. Software for optimizing prompts for a speech-enabled application, the speech-enabled application operable to receive a communication from each of a plurality of users and to communicate one or more prompts to each user to illicit one or more responses from the user indicating the purpose of the user's communication, the software embodied in a computer-readable medium and when executed operable to:
 determine a plurality of prompt alternatives to evaluate, each prompt alternative comprising one or more prompts;
 determine an evaluation period for each prompt alternative;
 present each prompt alternative to one or more users during the associated evaluation period;
 record one or more results of one or more responses to each prompt alternative received from the users;
 analyze the recorded results for each prompt alternative based on one or more performance criteria; and
 implement one of the prompt alternatives based on the analysis of the recorded results.

21. The software of claim 20, wherein:
 one or more of the prompt alternatives comprise a combination of prompts; and
 the software is further operable to determine the order in which to present the prompts in the combination.

22. The software of claim 20, wherein the evaluation period comprises the period during which a selected number of user communications are received at the speech-enabled application.

23. The software of claim 20, wherein the evaluation period comprises a selected length of time.

24. The software of claim 20, wherein recording one or more results of one or more responses comprises recording the number of direct routes that result from the user responses to each prompt alternative.

25. The software of claim 24, wherein analyzing the recorded results for each prompt alternative comprises determining which prompt alternative has the highest percentage of direct routes.

26. The software of claim 20, wherein:
 the speech-enabled application is operable to match one or more user responses with an action-object based on one or more salient terms in the user responses that are associated with the action-object; and
 recording one or more results of one or more responses comprises recording the number of user responses that the speech-enabled application is able to match with an action-object.

27. The software of claim 26, wherein analyzing the recorded results for each prompt alternative comprises determining which prompt alternative has the highest percentage of responses that the speech-enabled application is able to match with an action-object.

28. The software of claim 20, wherein the speech-enabled application comprises a call center.

* * * * *

UNITED STATES PATENT AND TRADEMARK OFFICE
CERTIFICATE OF CORRECTION

PATENT NO. : 7,043,435 B2
APPLICATION NO. : 10/942605
DATED : May 9, 2006
INVENTOR(S) : Knott et al.

Page 1 of 1

It is certified that error appears in the above-identified patent and that said Letters Patent is hereby corrected as shown below:

On the title page (73), replace "Knowledgfe" with --Knowledge--.

On the title page (56), after "6,314,402 B1", replace "2001" with --2002--.

On the title page (56), after "6,516,051", replace "B1" with --B2--.

On the title page (56), after "6,598,022", replace "B1" with --B2--.

Signed and Sealed this

Tenth Day of April, 2007

JON W. DUDAS
*Director of the United States Patent and Trademark Office*